(12) United States Patent
Agirman et al.

(10) Patent No.: US 10,343,872 B2
(45) Date of Patent: Jul. 9, 2019

(54) ELEVATOR SYSTEM HAVING BATTERY AND ENERGY STORAGE DEVICE

(71) Applicant: OTIS ELEVATOR COMPANY, Farmington, CT (US)

(72) Inventors: Ismail Agirman, Southington, CT (US); Carlo Mezzadri, Milan (IT)

(73) Assignee: OTIS ELEVATOR COMPANY, Farmington, CT (US)

( * ) Notice: Subject to any disclaimer, the term of this patent is extended or adjusted under 35 U.S.C. 154(b) by 684 days.

(21) Appl. No.: 14/888,807

(22) PCT Filed: May 8, 2013

(86) PCT No.: PCT/US2013/040041
§ 371 (c)(1),
(2) Date: Nov. 3, 2015

(87) PCT Pub. No.: WO2014/182291
PCT Pub. Date: Nov. 13, 2014

(65) Prior Publication Data
US 2016/0083220 A1 Mar. 24, 2016

(51) Int. Cl.
*B66B 1/06* (2006.01)
*B66B 1/30* (2006.01)
(Continued)

(52) U.S. Cl.
CPC ............ *B66B 1/302* (2013.01); *H01M 10/06* (2013.01); *H01M 10/441* (2013.01);
(Continued)

(58) Field of Classification Search
CPC ... B66B 1/302; H02P 3/12; H02P 3/14; H02P 2207/05; H01M 10/06; H01M 10/441;
(Continued)

(56) References Cited

U.S. PATENT DOCUMENTS 4,203,151 A   5/1980 Baker
6,439,348 B2 * 8/2002 Tajima ................ B66B 1/30
                                                  187/290
(Continued)

FOREIGN PATENT DOCUMENTS

CN    102001557 A    4/2011
EP    0570934 A2    11/1993
(Continued)

OTHER PUBLICATIONS

European Search Report for application EP13884172.1, U320085EP, dated Jul. 20, 2017, 4 pages.
(Continued)

*Primary Examiner* — Anthony J Salata
(74) *Attorney, Agent, or Firm* — Cantor Colburn LLP

(57) ABSTRACT

A system for an elevator includes at least one battery and an energy exchanger coupled to the at least one battery and configured to let a DC bus float between a first voltage and a second voltage. An energy storage device is coupled to the energy exchanger. The energy storage device is configured to recapture energy that is not recaptured by the at least one battery during a run of the elevator. The energy storage device is also configured to provide energy to the elevator when demand for energy by the elevator exceeds a threshold.

10 Claims, 17 Drawing Sheets

(51) Int. Cl.
*H02J 5/00* (2016.01)
*H02P 3/14* (2006.01)
*H02J 7/02* (2016.01)
*H02J 7/14* (2006.01)
*H02J 7/34* (2006.01)
*H02J 7/35* (2006.01)
*H02P 3/12* (2006.01)
*H01M 10/06* (2006.01)
*H01M 10/44* (2006.01)
*H01M 16/00* (2006.01)
*H02J 7/00* (2006.01)
*H01M 10/0525* (2010.01)
*H01M 10/30* (2006.01)

(52) U.S. Cl.
CPC ............... *H01M 16/00* (2013.01); *H02J 5/00* (2013.01); *H02J 7/0068* (2013.01); *H02J 7/02* (2013.01); *H02J 7/1423* (2013.01); *H02J 7/345* (2013.01); *H02J 7/35* (2013.01); *H02P 3/12* (2013.01); *H02P 3/14* (2013.01); *H01M 10/0525* (2013.01); *H01M 10/30* (2013.01); *H01M 2220/00* (2013.01); *H02P 2207/05* (2013.01); *Y02B 50/142* (2013.01); *Y02E 60/122* (2013.01); *Y02E 60/124* (2013.01); *Y02E 60/126* (2013.01)

(58) Field of Classification Search
CPC ............. H01M 16/00; H01M 2220/00; H01M 10/0525; H01M 10/30; H02J 5/00; H02J 7/0068; H02J 7/02; H02J 7/1423; H02J 7/345; H02J 7/35; Y02B 50/42; Y02E 60/122; Y02E 60/124; Y02E 60/126
USPC ....... 187/247, 289, 290, 293, 296, 391, 393; 307/66, 68; 318/139, 799–815
See application file for complete search history.

(56) References Cited

U.S. PATENT DOCUMENTS

| | | | | |
|---|---|---|---|---|
| 6,474,447 B2* | 11/2002 | Tajima | ...................... | B66B 1/30 187/290 |
| 6,827,182 B2* | 12/2004 | Araki | ...................... | B66B 5/027 187/290 |
| 7,554,278 B2* | 6/2009 | Wegner-Donnelly | ........................ | B66C 13/18 187/277 |
| 8,172,042 B2* | 5/2012 | Wesson | .................. | B66B 1/308 187/290 |
| 8,230,978 B2* | 7/2012 | Agirman | ................. | B66B 5/027 187/290 |
| 8,629,637 B2* | 1/2014 | Blasko | ................... | B66B 1/302 318/376 |
| 8,689,944 B2* | 4/2014 | Manfredi | ................. | B66B 1/30 187/289 |
| 8,887,872 B2* | 11/2014 | Chen | ................. | G01R 31/3651 187/290 |
| 9,834,406 B2* | 12/2017 | Mezzadri | ................ | B66B 1/306 |
| 9,914,617 B2* | 3/2018 | Horbrugger | ............ | B66B 1/302 |
| 2009/0014252 A1* | 1/2009 | Vedula | .................... | B66B 1/302 187/290 |
| 2010/0181828 A1 | 7/2010 | Handa et al. | | |
| 2012/0043923 A1 | 2/2012 | Ikriannikov et al. | | |
| 2012/0200242 A1 | 8/2012 | Grady | | |

FOREIGN PATENT DOCUMENTS

| | | | | |
|---|---|---|---|---|
| EP | 1235323 A1 | | 8/2002 | |
| JP | 2001019310 A | * | 1/2001 | |
| JP | 2006264887 A | | 10/2006 | |
| JP | 2008079436 A | | 4/2008 | |
| JP | 2011050153 A | | 3/2011 | |
| WO | 2012012482 A1 | | 1/2012 | |
| WO | WO 2012126728 A1 | * | 9/2012 | ............. B66B 1/302 |
| WO | 2012172590 A1 | | 12/2012 | |

OTHER PUBLICATIONS

European Search Report for application EP 13884172, dated Sep. 16, 2016, 7 pages.
Apex Battery, "Otis Elevator Batteries", http://www.apexbattery.com/sealed-lead-acid-batteries-otis-elevator-batteries.html, accessed Feb. 20, 2013, 1 page.
Chooyu Chemical, "PAKCOOL Conductive Material for Industry and Automotive Electronicsheat conductive solutions", http://www.chooyuchem.com/industry, accessed Feb. 20, 2013, 2 pages.
Ideal Power Converters, "30kW Battery Converter IBC-30kW-480", www.Ideal-Converter.com, Sep. 2012, 4 pages.
International Search Report for application PCT/US2013/040041, dated Feb. 14, 2014, 5 pages.
Qing-zhang, Chen et al., "Research on the lead-acid battery and ultra-capacitor energy storing system of motor vehicles regenerative braking", abstract, Computer Science and Automation Engineering (CSAE), 2012 IEEE International Conference May 25-27, 2pg.
Written Opinion for application PCT/US2013/040041, dated Feb. 14, 2014, 7 pages.
European Office Action for application EP 13884172.1, dated Dec. 6, 2018, 34 pages.

* cited by examiner

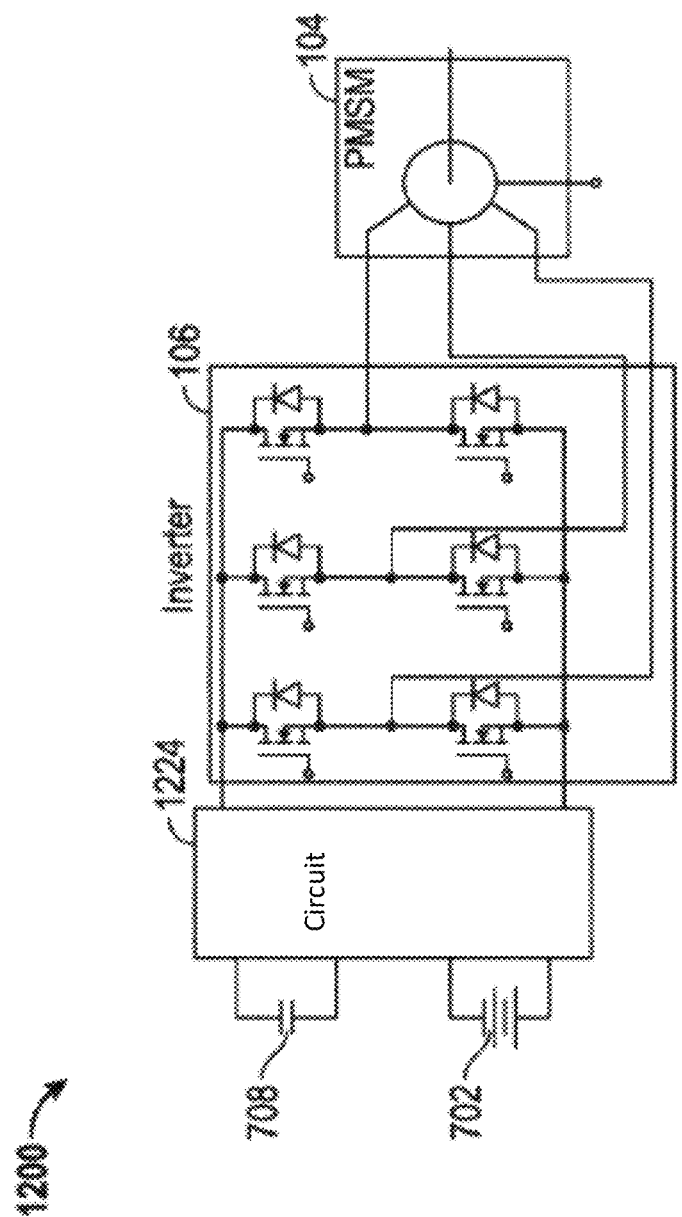

ELEVATOR SYSTEM HAVING BATTERY AND ENERGY STORAGE DEVICE

BACKGROUND

In a given elevator system or environment, one or more sources may be used to provide power. For example, FIG. 1A shows an architecture or circuit 100 for an elevator system. The architecture 100 may include a battery 102 serving as a source of power for a motor 104, such as a permanent-magnet synchronous motor (PMSM). An inverter 106, denoted by the boxed components in FIG. 1A, may be used to generate currents for the motor 104.

The battery 102 may be a lead acid battery and may nominally provide forty-eight volts (48V). As shown in FIG. 1A, the negative terminal of the battery 102 may be grounded. The battery 102 may be charged by a charger 108.

A number of issues may be associated with the architecture/circuit 100 of FIG. 1A. For example, excessive regenerated energy may be consumed in the form of heat via a dynamic braking resistor (DBR) 110 and a dynamic braking transistor (DBT) 112. The charge acceptance rate of the battery 102 may be low. The battery 102 may be ill-suited to provide for instantaneous power capability. A large drop of voltage may be experienced across a capacitor 114 at the "DC link" node or bus, which may result in a lower motor voltage and higher currents, degrading performance in terms of speed and energy efficiency.

Poor travel efficiency may be realized due to DBR, excessive charging rate for batteries and other losses caused by high current levels. Only A variable speed (e.g., minimum 0.63 m/s and maximum 1 m/s) may be realized at competitive cost, with a maximum rise of 21 m and a maximum load of 630 Kg, which may be ill-suited to many markets (e.g., India, Brazil, China, etc.).

BRIEF SUMMARY

An embodiment of the disclosure is directed to a system for powering a motor of an elevator, comprising: a first lead acid battery, and a second lead acid battery coupled to the first battery, wherein the first and second batteries are center grounded.

An embodiment of the disclosure is directed to a system for an elevator, comprising: at least one lead acid battery, and an energy exchanger coupled to the at least one battery and configured to let a DC bus float between a first voltage and a second voltage.

An embodiment of the disclosure is directed to a method comprising: charging a lead acid battery, providing by the battery a majority of energy required by a load and providing a remainder of the energy required by the load via an energy storage device, and capturing by the battery a portion of energy regenerated by the load and capturing by the energy storage device a remainder of the energy regenerated by the load.

An embodiment of the disclosure is directed to a method comprising: supplying a charger using a main external grid, charging a battery from the charger, supplying ultra-capacitors from the battery during a running and idle time associated with an elevator, regenerating energy from the ultra-capacitors to the battery during the running and idle time, during the running, supplying a substantial amount of power required by a drive-motor load from the ultra-capacitors and supplying a remainder of the power required by the load from the battery, and during the running, storing a substantial amount of power regenerated by the load in the ultra-capacitors and storing a remainder of the power regenerated by the load in the battery.

An embodiment of the disclosure is directed to a method comprising: supplying a rectifier circuit using a main external grid, supplying ultra-capacitors from the rectifier circuit, during a running and idle time associated with an elevator, adjusting a state of charge of the ultra-capacitors between thresholds using a battery, during the running and idle time, the battery regenerates energy from the ultra-capacitors adjusting a state of charge of the ultra-capacitors between the thresholds, during the running, supplying a substantial amount of power required by a drive-motor load from the ultra-capacitors and rectifier circuit and supplying a remainder of the power required by the load from the battery, and during the running, storing a substantial amount of power regenerated by the load in the ultra-capacitors and storing a remainder of the power regenerated by the load in the battery.

Additional embodiments are described below.

BRIEF DESCRIPTION OF THE DRAWINGS

The present disclosure is illustrated by way of example and not limited in the accompanying figures in which like reference numerals indicate similar elements.

FIG. 12 illustrates an exemplary power architecture incorporating a multiple input energy converter in accordance with one or more embodiments of the disclosure.

DETAILED DESCRIPTION

Figure 1A:
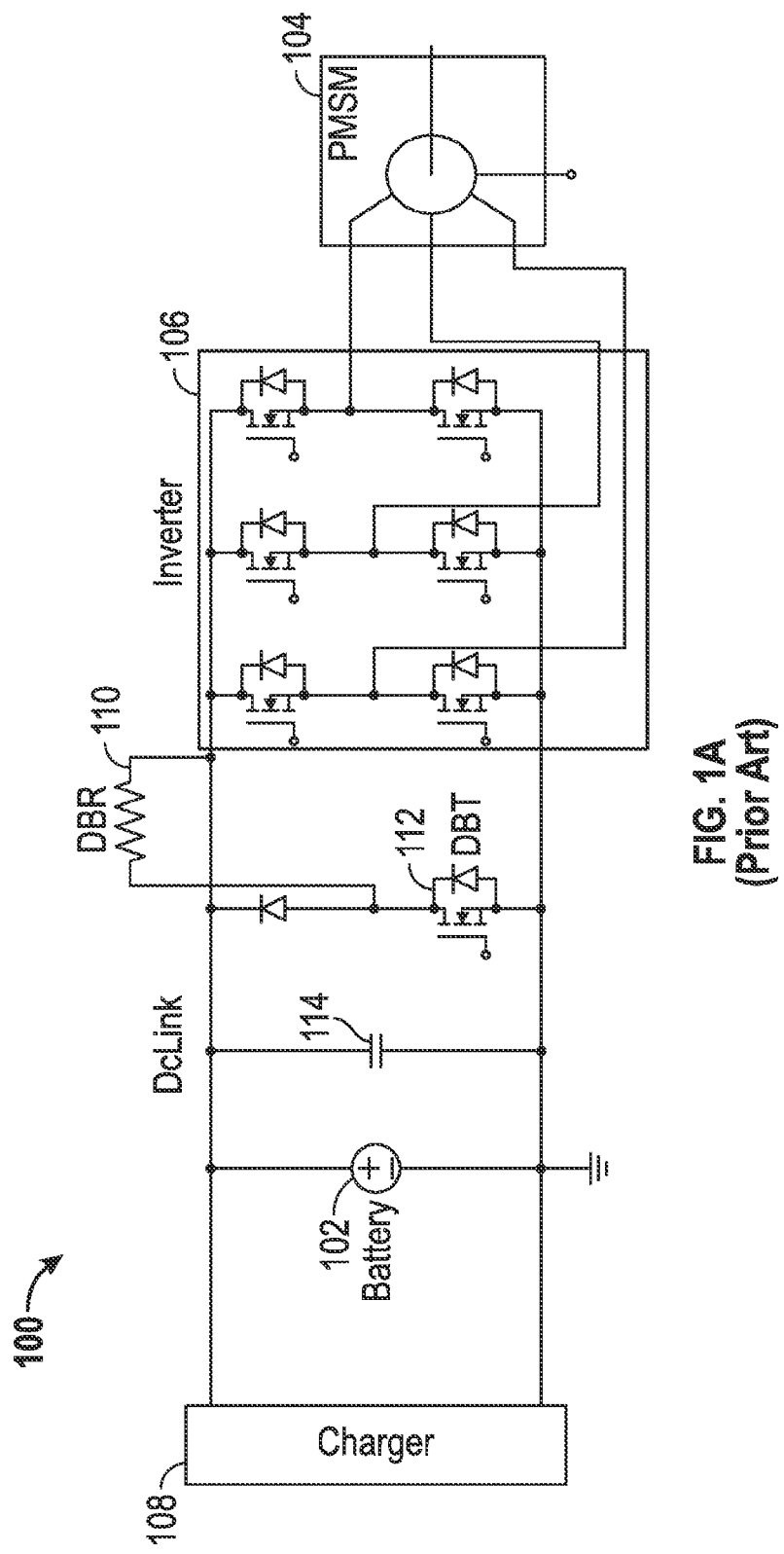
FIG. 1A illustrates a power architecture in accordance with the prior art.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems and methods are described for accepting or delivering power or energy rapidly. In some embodiments, devices used to accept/deliver power or energy may act in a so-called peak shaving mode, enabling the devices to be as small as possible. Accordingly, device cost may be minimized. In some other embodiments of apparatuses, the component (e.g. ultra-capacitors) able to accept or deliver energy rapidly is directly connected with drive DC-link, accordingly device cost may be minimized due to the electrical topology itself.

Figure 1B:
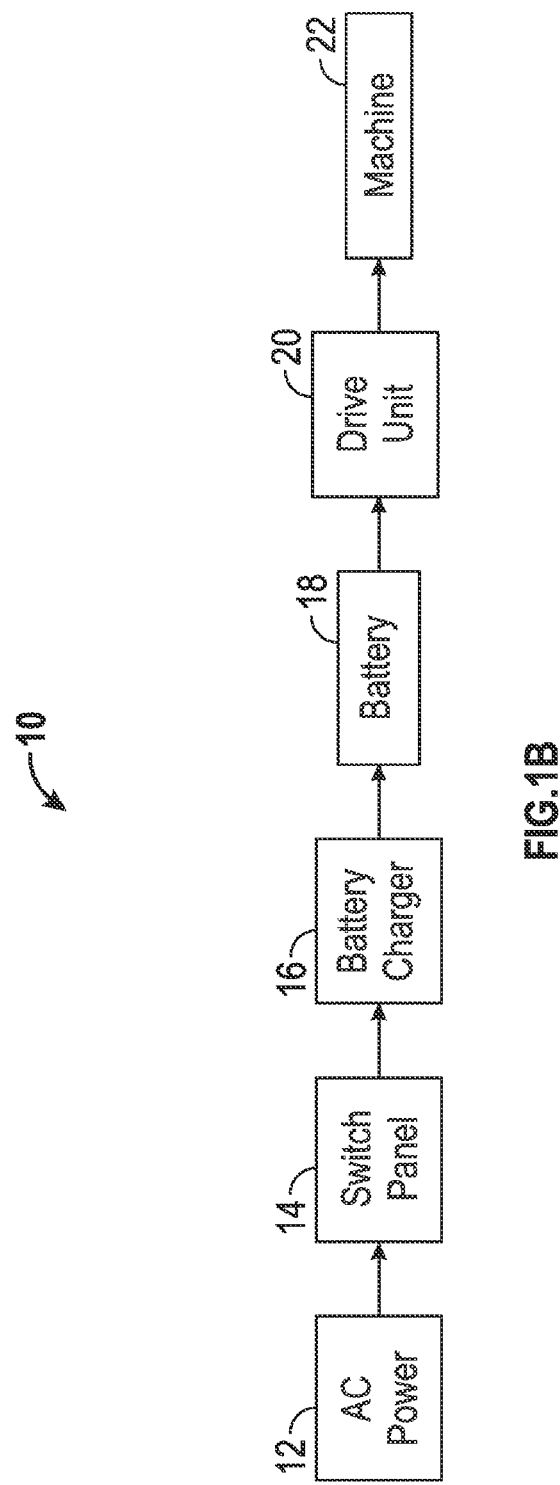
FIG. 1B is a block diagram of components of an elevator system in an exemplary embodiment.

FIG. 1B is a block diagram of components of an elevator system 10 in an exemplary embodiment. Elevator system 10 includes a source of AC power 12, such as an electrical main line (e.g., 230 volt, single phase). The AC power 12 is provided to a switch panel 14, which may include circuit breakers, meters, etc. From the switch panel 14, AC power is provided to a battery charger 16, which converts the AC power to DC power to charge battery 18. Battery 18 powers drive unit 20, and may be a lead-acid battery or other type of battery or combination of different type of batteries and ultra-capacitors. Drive unit 20 includes a control circuit board and a power circuit board, as described in further detail herein. The power circuit board converts DC power from battery 18 to AC drive signals, which drive machine 22. The AC drive signals may be multiphase (e.g., three-phase) drive signals for a three-phase motor in machine 22. It is noted that battery 18 is the sole power source to the drive unit 20, and the AC power 12 is not directly coupled to the drive unit 20.

Figure 2:
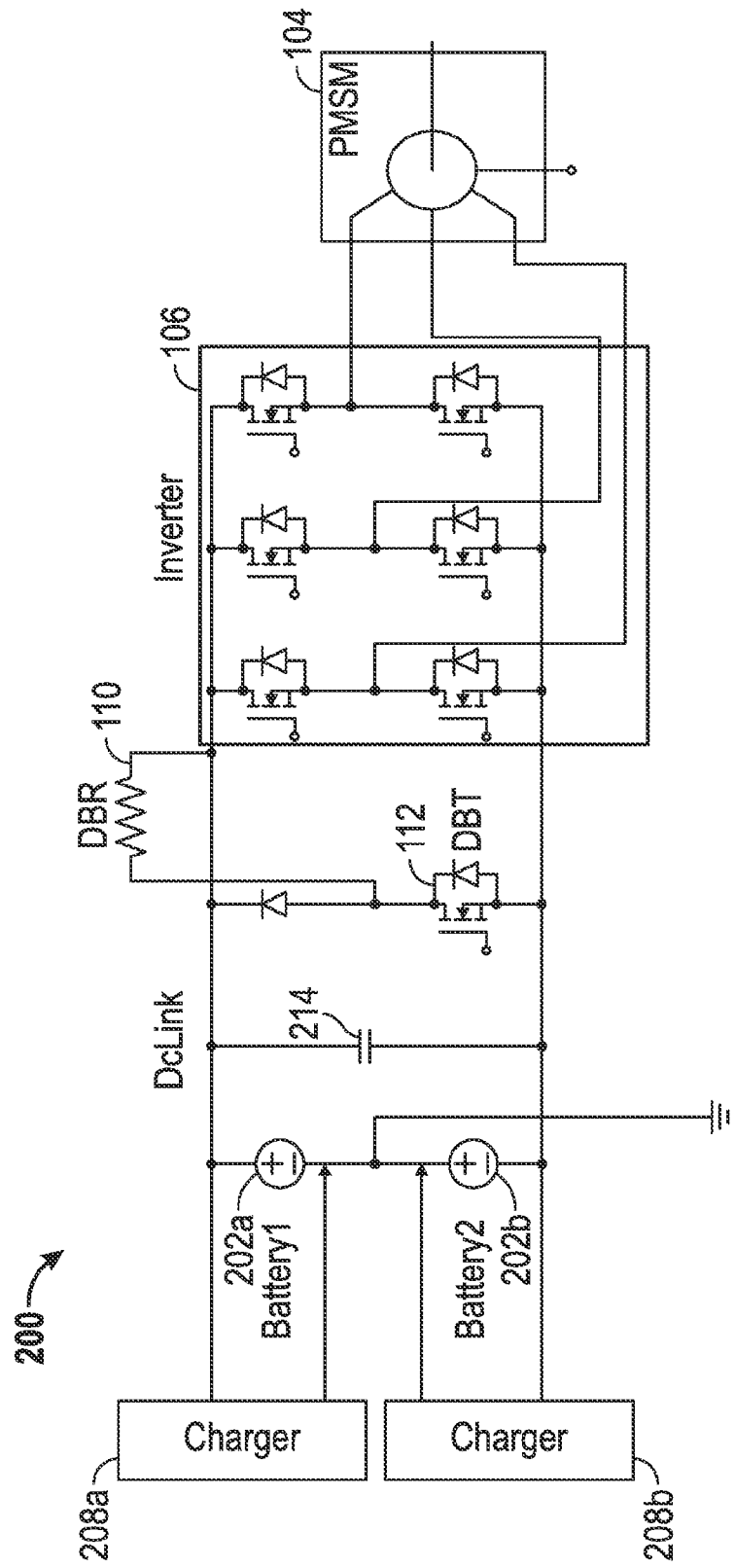
FIG. 2 illustrates an exemplary power architecture incorporating center grounded batteries each with their own charger in accordance with one or more embodiments of the disclosure.

Turning now to FIG. 2, an exemplary power architecture 200 in accordance with one or more embodiments is shown. The architecture 200 is shown as including many of the components and devices described above, and so, a complete re-description is omitted for the sake of brevity. The architecture 200 may include two batteries (or battery pack), a first battery 202a and a second battery 202b. The batteries 202a and 202b may be coupled to one another with the coupling node between them grounded as shown in FIG. 2, thereby providing a center-grounded configuration. One or both of the batteries 202a and 202b may each be a lead acid battery. One or both of the batteries 202a and 202b may each provide 48V (nominal), such that the voltage may still be in a "safe-touch" range.

The battery 202a may be charged by a charger 208a. The battery 202b may be charged by a charger 208b. The charger 208a and/or the charger 208b may be off-the-shelf types of devices such that the cost of the charger(s) may be less than if a custom or less-readily available charger was needed.

The architecture 200 may provide a number of features. For example, the architecture 200 may provide double the duty (power) capacity relative to the architecture 100 of FIG. 1A using potentially the same currents, and therefore, not requiring additional material (e.g., copper). In FIG. 2, the maximum voltage measured with respect to ground may be (approximately) less than or equal to 48V. In some embodiments, the chargers 208a and 208b may correspond to the charger 108 of FIG. 1A, allowing for re-use of the charger 108. In the architecture 200, a voltage capability or capacity of one or more switches and a DC link capacitor 214 may be increased relative to the counterpart components of the architecture 100 of FIG. 1A.

Figure 3:
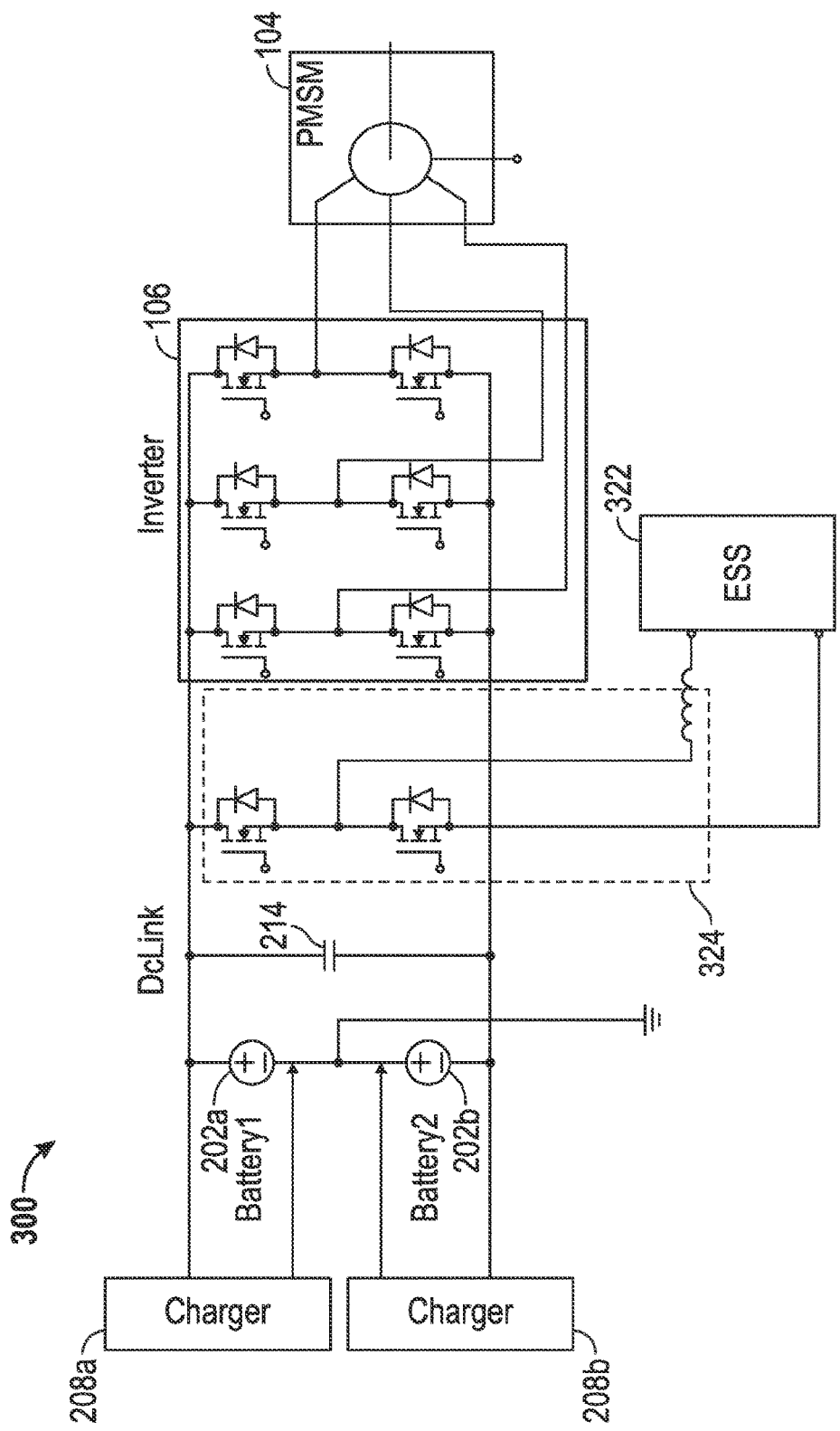
FIG. 3 illustrates an exemplary power architecture incorporating center grounded batteries each with their own charger and an energy storage device connected by a power exchanger circuit that may be a DC-DC converter in accordance with one or more embodiments of the disclosure.

Turning now to FIG. 3, an exemplary power architecture 300 in accordance with one or more embodiments is shown. The architecture 300 is shown as including many of the components and devices described above, and so, a complete re-description is omitted for the sake of brevity. The architecture 300 may include an energy storage device (ESS) 322. The ESS 322 may be configured to rapidly accept or release energy. The ESS 322 may include one or more of lithium-ion (Li-ion) battery (e.g., 24, 48, . . . volts), a nickel-metal hydride (NiMH) battery (e.g., 24, 48, . . . volts), and a super-capacitor or ultra-capacitor.

The architecture 300 may provide a number of features. For example, the ESS 322 may provide for high/fast energy acceptance and high (peak) power capability, which may be used to compensate for low energy acceptance and low peak power capability associated with one or both of the batteries 202a and 202b. The ESS 322 may be used to recapture energy that is not recaptured by the batteries 202a and 202b during a run.

The architecture 300 may include a bi-directional power switch/circuit 324, which may be used to recycle regenerated energy. The circuit 324 may correspond to an energy exchanger and may be configured to let the DC link float between a maximum voltage and a minimum voltage. The circuit 324 may be configured using one or more controls. For example, a hardware or software based control may be used to configure the circuit 324. In some embodiments, the circuit 324 may correspond to a DC/DC converter. As part of the architecture 300, a stiffer or tighter DC bus may be enabled within a band (e.g., 45 to 60 Volts) to enable relaxed motor voltage requirements.

Turning now to FIGS. 4A-4E, flow chart of exemplary methods 400A-400E are shown. One or more of the methods 400A-400E may be used in connection with one or more apparatuses, systems, or architectures, such as those described herein (e.g., the architecture 300). In some embodiments, one or more of the methods 400A-400E may be used to provide and recapture/recycle energy.

Figure 4A:
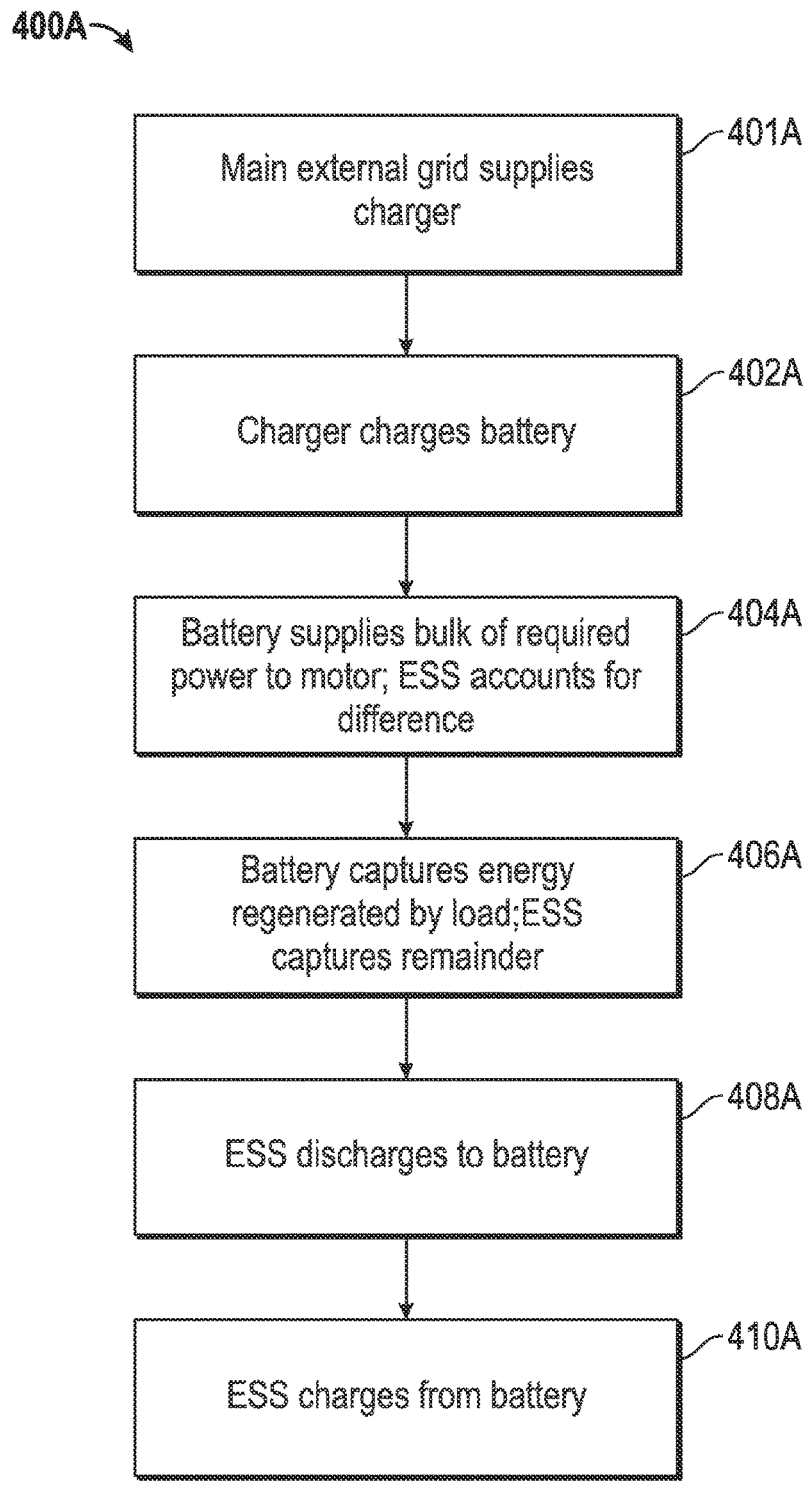
FIGS. 4A-E illustrates flow charts of exemplary methods in accordance with one or more embodiments of the disclosure

Referring to FIG. 4A, in block 401A a main external grid may supply a charger (e.g., charger 208a or 208b)

In block 402A, the charger may charge a battery (e.g., battery 202a or 202b).

In block 404A, the battery may supply the bulk or the majority of the power required by a motor (e.g., motor 104) via an inverter (e.g., inverter 106). As part of block 404A, any deficiency in power provided by the battery may be supplied by an ESS (e.g., ESS 322), resulting in so-called "peak shaving".

In block 406A, the battery may capture energy regenerated by the load (e.g., the motor and inverter). The ESS may capture the remainder of the regenerated energy.

In block 408A, if the ESS charges above a threshold (e.g., to its capacity), the ESS may (slowly) discharge to the battery during, e.g., an idle time.

In block 410A, if the ESS discharges beyond a threshold (e.g., 50% state of charge (SOC)), the ESS may charge from the battery during, e.g., an idle time.

As part of the method 400A, the DC bus/link voltage (e.g., the voltage across the capacitor 214) may be left unregulated within a given range (e.g., 45V-60V). If the DC bus/link voltage is tending to exceed the given range, a regulator may activate and cause bidirectional power flow within the circuit 324.

Figure 4B:
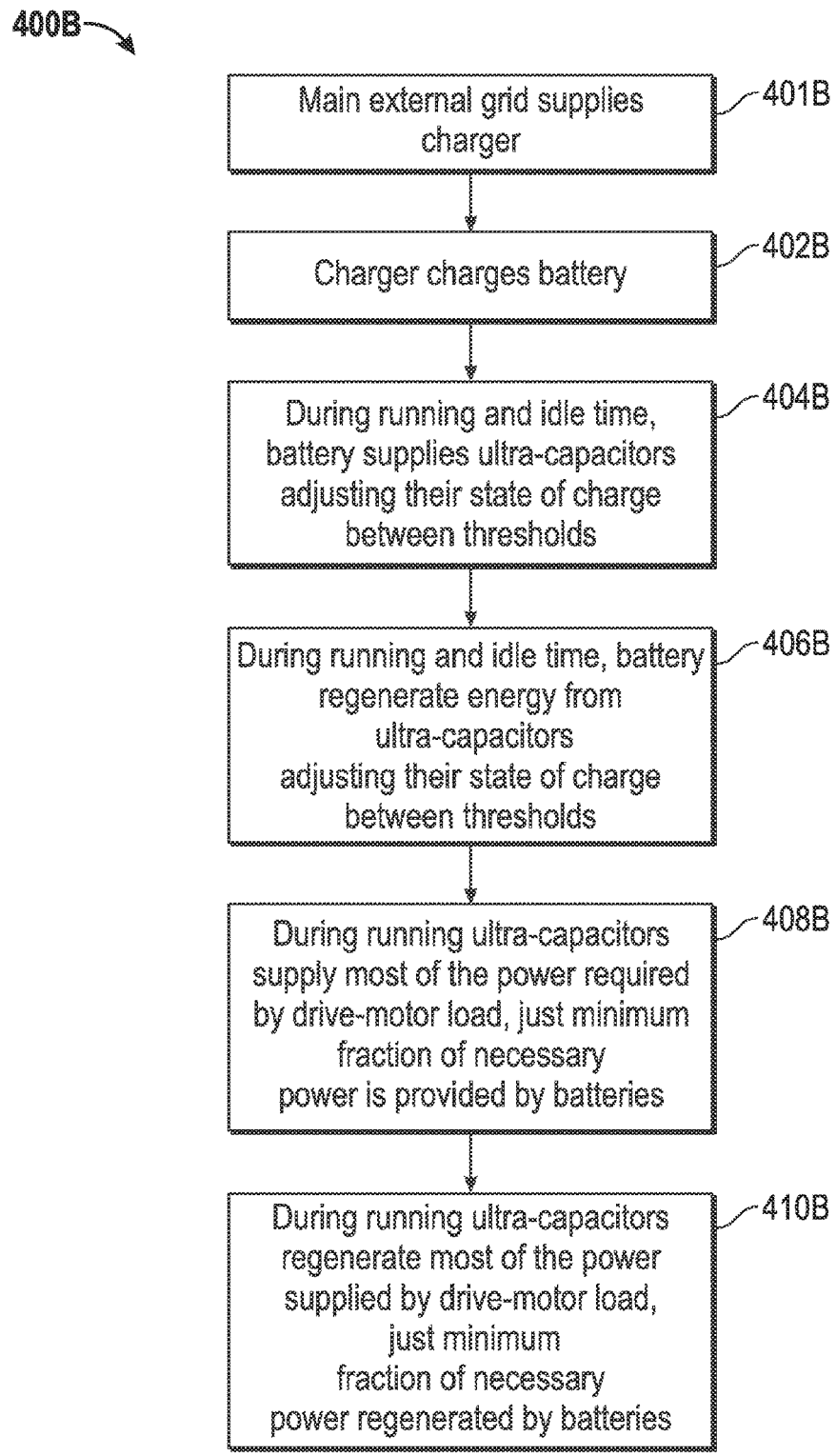

Referring to FIG. 4B, in block 401B the main external grid may supply power or energy to the charger.

In block 402B, the charger may charge the battery.

In block 404B, the battery may supply ultra-capacitors, adjusting their state of charge between thresholds. Such activity may occur during running or idle time.

In block 406B, the battery may regenerate energy from the ultra-capacitors, adjusting their state of charge between thresholds. Such activity may occur during running or idle time.

In block 408B, the ultra-capacitors may supply most of the power required by a load (e.g., drive-motor). A (minimum) fraction of the power required by the load may be provided by batteries. Such activities may occur during running.

In block 410B, the ultra-capacitors may regenerate most of the power supplied by the load. A (minimum) fraction of the necessary power may be regenerated by the batteries. Such activities may occur during running.

Figure 4C:
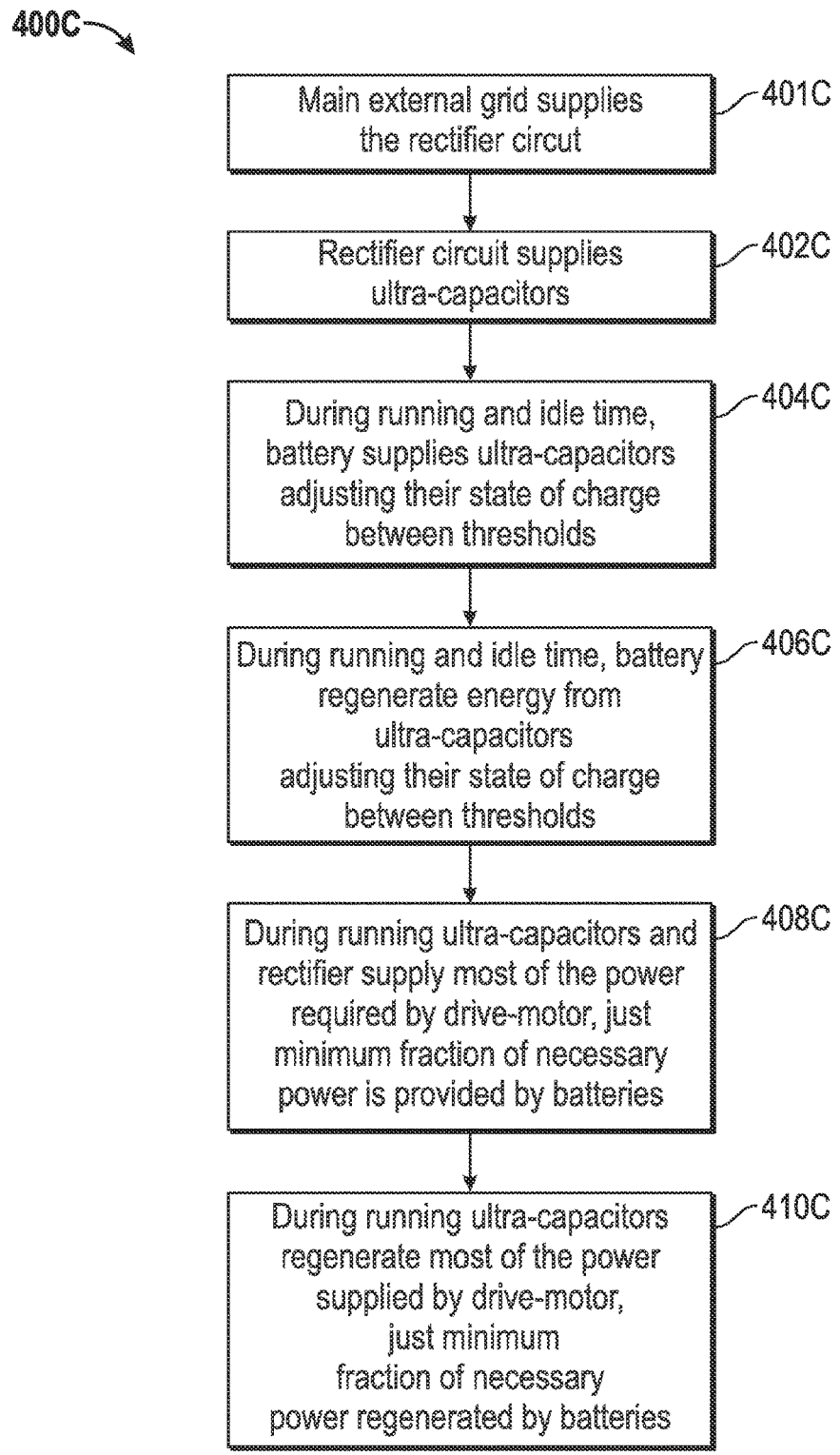

Referring to FIG. 4C, in block 401C the main external grid may supply power or energy to a rectifier circuit (see, e.g., the description of rectifier circuit 802 below).

In block 402C, the rectifier circuit may supply the ultra-capacitors.

In block 404C, the battery may supply the ultra-capacitors, adjusting their state of charge between thresholds. Such activity may occur during running or idle time.

In block 406C, the battery may regenerate energy from the ultra-capacitors, adjusting their state of charge between thresholds. Such activity may occur during running or idle time.

In block 408C, the ultra-capacitors and rectifier circuit may supply most of the power required by a load (e.g., drive-motor). A (minimum) fraction of the power required by the load may be provided by batteries. Such activities may occur during running.

In block 410C, the ultra-capacitors may regenerate most of the power supplied by the load. A (minimum) fraction of the necessary power may be regenerated by the batteries. Such activities may occur during running.

Figure 4D:
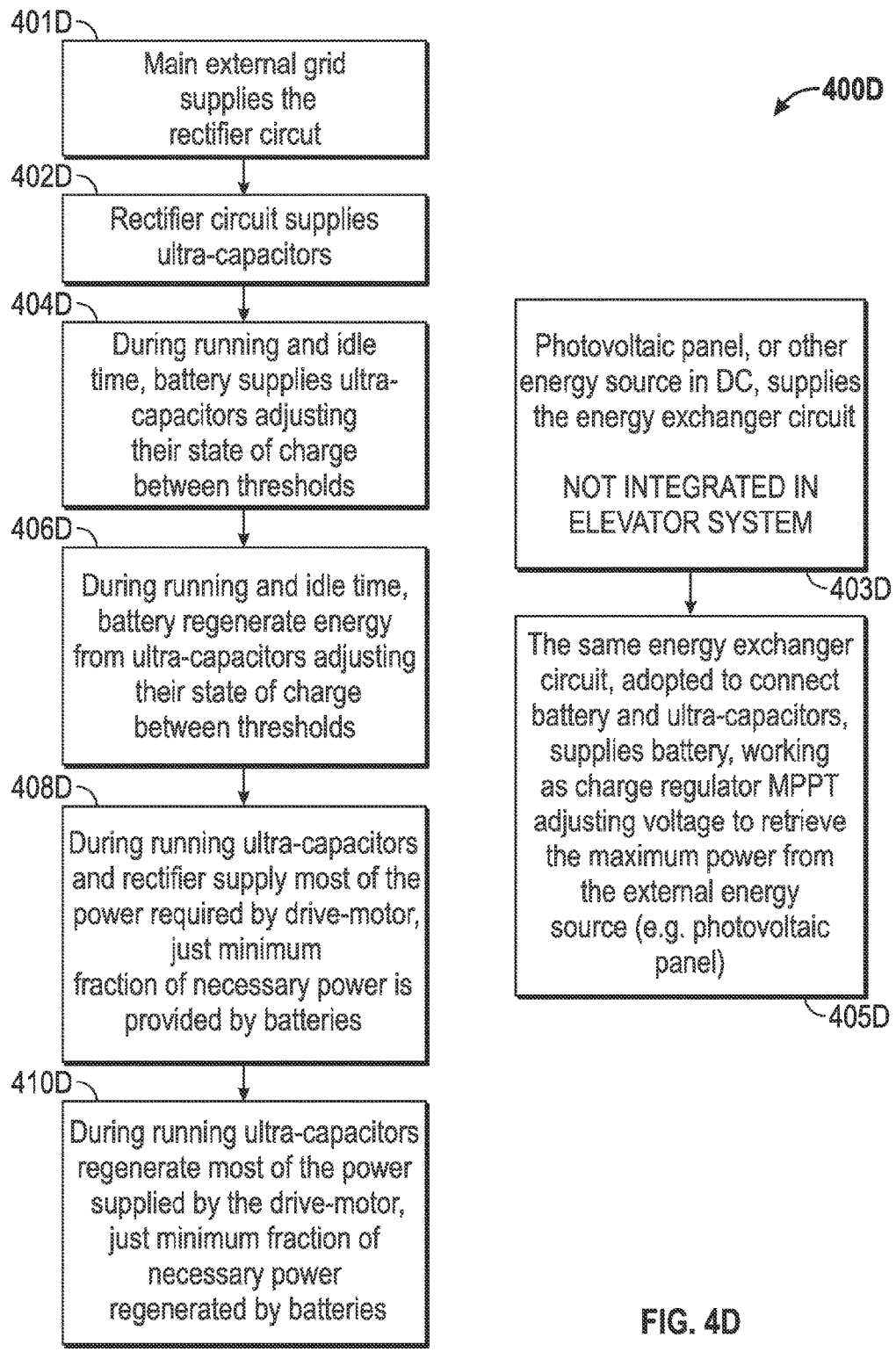

Referring to FIG. 4D, in block 401D the main external grid may supply power or energy to the rectifier circuit.

In block 402D, the rectifier circuit may supply the ultra-capacitors.

In block 404D, the battery may supply the ultra-capacitors, adjusting their state of charge between thresholds. Such activity may occur during running or idle time.

In block 406D, the battery may regenerate energy from the ultra-capacitors, adjusting their state of charge between thresholds. Such activity may occur during running or idle time.

In block 408D, the ultra-capacitors and the rectifier circuit may supply most of the power required by a load (e.g., drive-motor). A (minimum) fraction of the power required by the load may be provided by batteries. Such activities may occur during running.

In block 410D, the ultra-capacitors may regenerate most of the power supplied by the load. A (minimum) fraction of the necessary power may be regenerated by the batteries. Such activities may occur during running.

As part of the method 400D, in block 403D a photovoltaic (PV) panel (see, e.g., the description of PV panel 902 below) or other energy source in DC may supply an energy exchanger circuit. One or more of these features may be integrated in an elevator system, or might not be integrated in the elevator system. In block 405D, the same energy exchanger circuit, adopted to connect the battery and ultra-capacitors, may supply the battery and work as a charge regulator maximum power point tracker (MPPT). Voltage may be adjusted to retrieve the maximum power from the external energy source (e.g., PV panel).

Figure 4E:
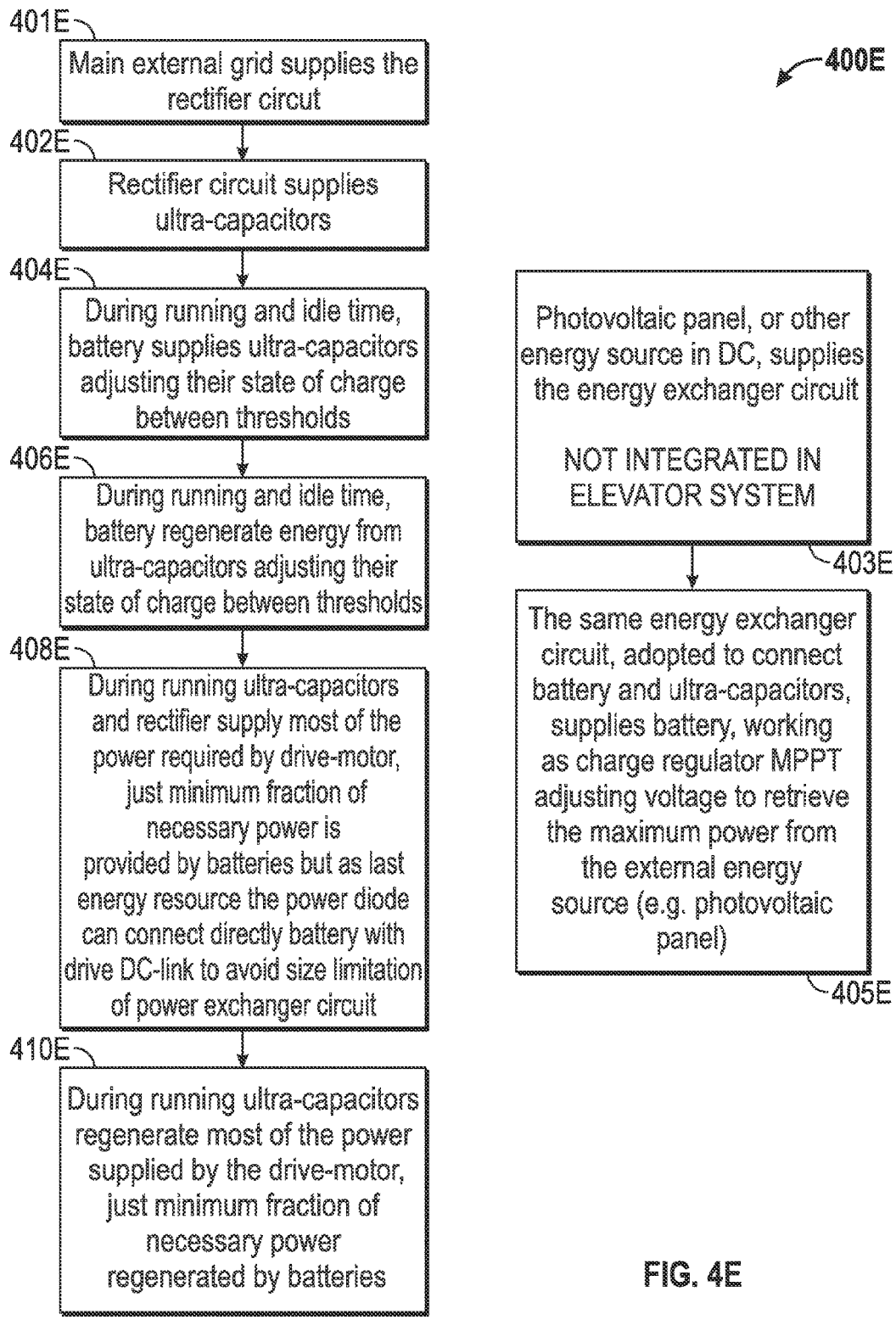

Referring to FIG. 4E, in block 401E the main external grid may supply power or energy to the rectifier circuit.

In block 402E, the rectifier circuit may supply the ultra-capacitors.

In block 404E, the battery may supply the ultra-capacitors, adjusting their state of charge between thresholds. Such activity may occur during running or idle time.

In block 406E, the battery may regenerate energy from the ultra-capacitors, adjusting their state of charge between thresholds. Such activity may occur during running or idle time.

In block 408E, the ultra-capacitors and the rectifier circuit may supply most of the power required by a load (e.g., drive-motor). A (minimum) fraction of the power required by the load may be provided by batteries. A power diode (see, e.g., the description of power diode 1002 below) may directly connect the batteries with the drive DC-link to avoid a size limitation of a power exchanger circuit. Such activities may occur during running.

In block 410E, the ultra-capacitors may regenerate most of the power supplied by the load. A (minimum) fraction of the necessary power may be regenerated by the batteries. Such activities may occur during running.

As part of the method 400E, in block 403E a photovoltaic (PV) panel or other energy source in DC may supply a power or energy exchanger circuit. One or more of these features may be integrated in an elevator system, or might not be integrated in the elevator system. In block 405E, the same energy exchanger circuit, adopted to connect the battery and ultra-capacitors, may supply the battery and work as a charge regulator MPPT. Voltage may be adjusted to retrieve the maximum power from the external energy source (e.g., PV panel).

The methods 400A-E are illustrative. In some embodiments, one or more of the blocks or operations (or portions thereof) may be optional. In some embodiments, the operations may execute in an order or sequence different from what is shown. In some embodiments, one or more additional operations not shown may be included. In some embodiments, one or more portions of a first method (e.g., method 400A) may be combined with one or more portions of one or more other methods (e.g., methods 400B and/or 400C).

Figure 5:
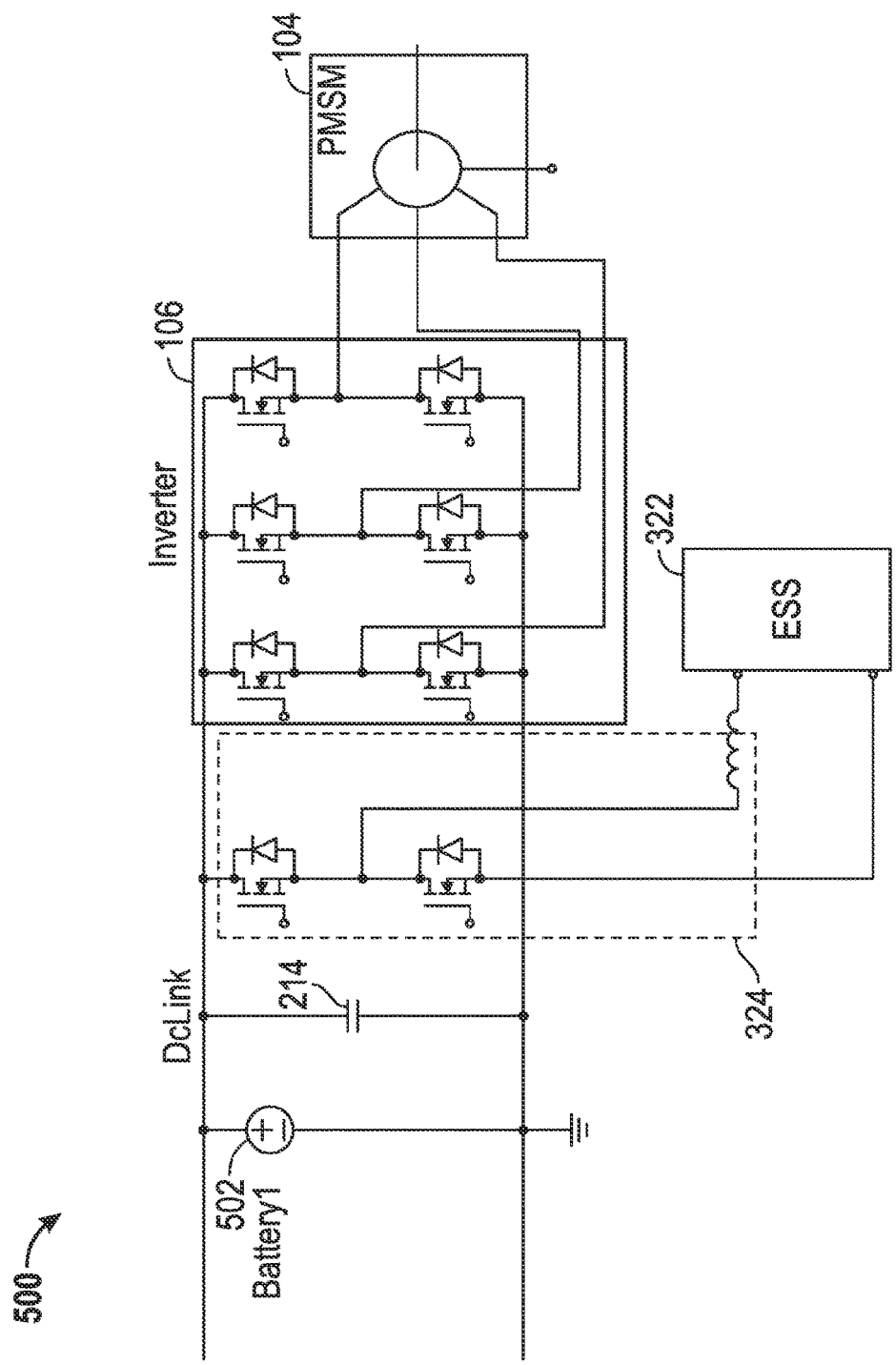
FIG. 5 illustrates an exemplary power architecture incorporating a battery and an energy storage device in accordance with one or more embodiments of the disclosure.

Turning now to FIG. 5, an exemplary power architecture 500 in accordance with one or more embodiments is shown. The architecture 500 is shown as including many of the components and devices described above, and so, a complete re-description is omitted for the sake of brevity. The architecture 500 may include a battery 502. The battery 502 may correspond to the battery 102 of FIG. 1A.

The architecture 500 is shown in FIG. 5 as being similar, although not identical, to the architecture 300 of FIG. 3. The architecture 500 deviates from the architecture 300 at least to the extent that the "battery branch" mirrors the "battery branch" of the architecture 100, where the battery 102/502 is grounded as opposed to center grounded. Furthermore, the architecture 500 is shown as not including a charger (e.g., charger 108 of FIG. 1A). The battery 502 may be charged via the circuit 324/ESS 322.

Figure 6:
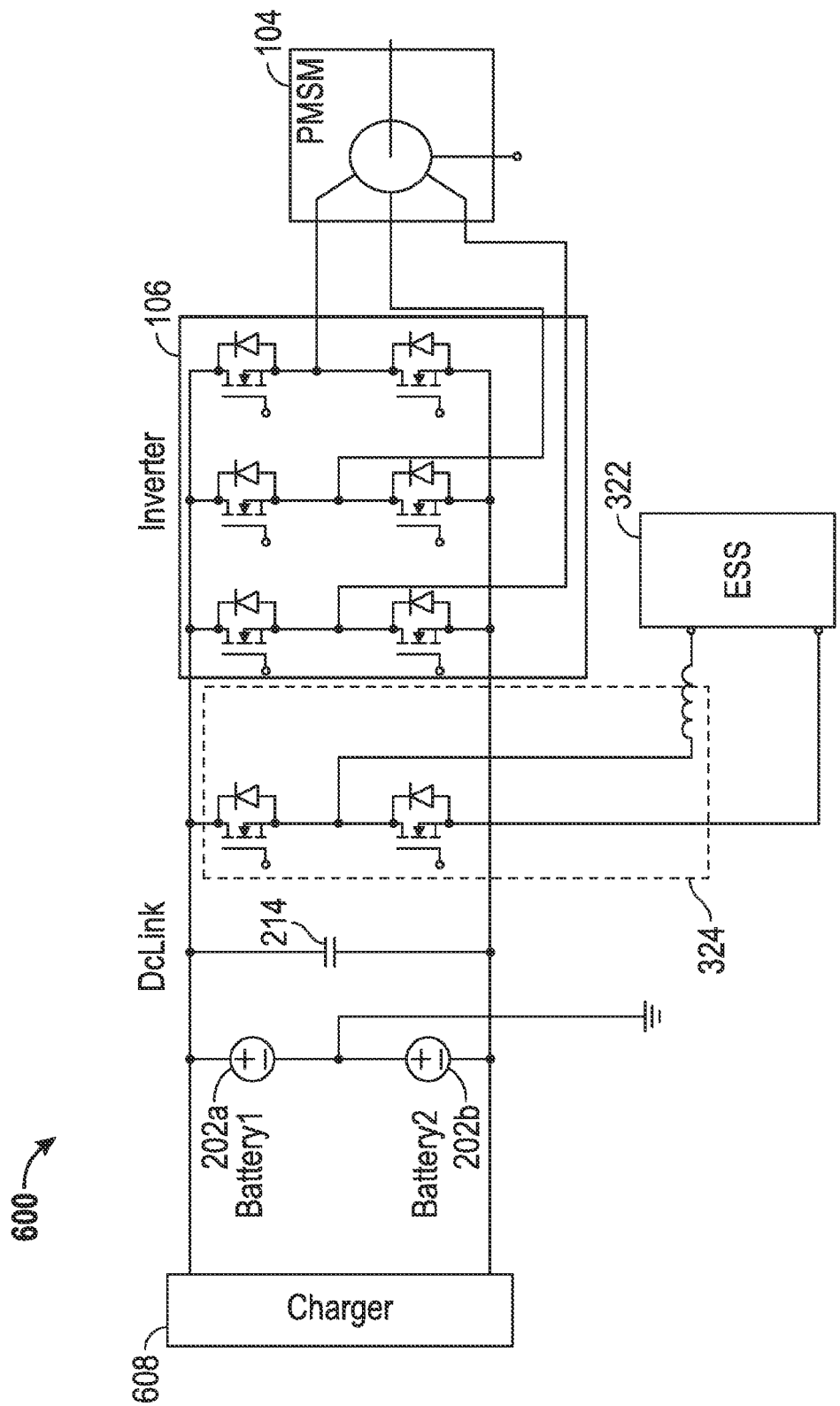
FIG. 6 illustrates an exemplary power architecture incorporating center grounded batteries using a common charger and an energy storage device in accordance with one or more embodiments of the disclosure.

Turning now to FIG. 6, an exemplary power architecture 600 in accordance with one or more embodiments is shown. The architecture 600 is shown as including many of the components and devices described above, and so, a complete re-description is omitted for the sake of brevity. The architecture 600 may represent a variation on the architectures 200 and 300, wherein a single charger 608 is used to charge the batteries 202a and 202b. The charger 608 may be analogous to the charger 108 of FIG. 1A.

Figure 7:
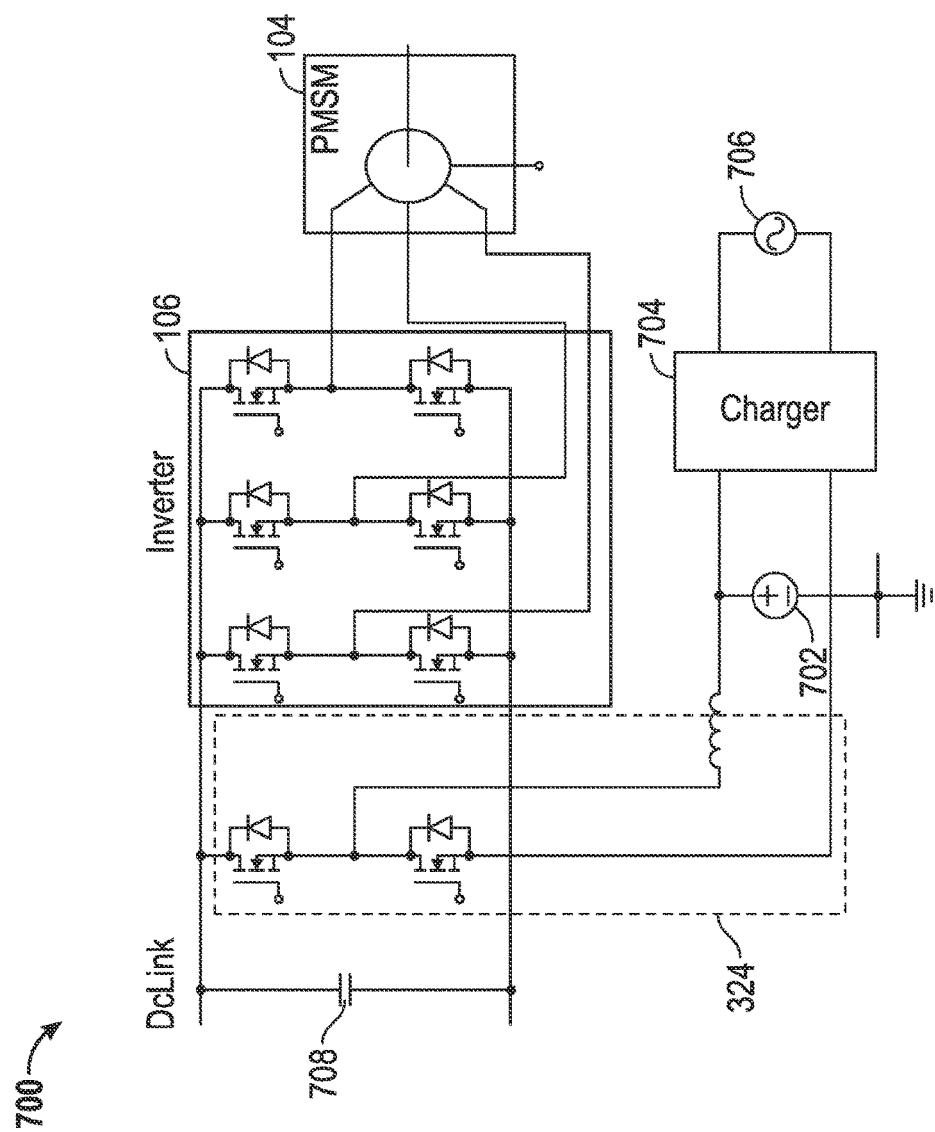
FIG. 7 illustrates an exemplary power architecture incorporating a battery with a charger and an ultra-capacitor in accordance with one or more embodiments of the disclosure.

Turning now to FIG. 7, an exemplary power architecture 700 in accordance with one or more embodiments is shown. The architecture 700 is shown as including many of the components and devices described above, and so, a complete re-description is omitted for the sake of brevity.

As shown in FIG. 7, the architecture 700 may include a battery 702. The battery 702 may correspond to or include a lead acid battery or other type of battery. The battery 702 may be configured to provide for a specified nominal voltage, such as 96 Volts. The battery 702 may be charged by a charger 704. The charger may receive input power from a source 706. In some embodiments, the source 706 may correspond to a single phase 220 Volt source with a frequency of 50 or 60 Hertz.

The architecture 700 may include one or more capacitors 708 or other battery type with hi performance in terms of short term power/energy. The capacitor 708 may correspond to an ultra-capacitor (UC). The UC may be referred to as an electric double layer capacitor (EDLC). The capacitor 708 may be configured to store a voltage up to a specified rating, such as 310 Volts.

The capacitor 708 may be used to supply energy on a short-term basis covering almost the entire power/energy demand of a drive-motor due to the load or recapturing almost the entire power/energy supplied by drive-motor due to the load. The battery 702 may be used just to regulate the state of charge of capacitor 708 reacting also when the elevator is in idle. Thus, the energy exchanger circuit 324 may be DC-DC converter that is not full size, minimizing cost.

The architecture 700 may provide a number of additional features. For example, a guaranteed high fraction of available UC energy (e.g., greater than 74%) may be available. The same UC energy may be provided with a lower capacitance at a higher voltage reducing UC cost. The battery 702 may function in a hybrid manner between cyclic and standby application, thereby extending the life of the battery 702. The circuit 324 may be made smaller and cheaper relative to other counterpart circuits due to fact that short term power/energy demand of inverter 106 is supplied via the circuit 324. For example, the circuit 324 may be used in FIG. 7 to cover an energy gap on the UC during an idle time. A relative low voltage may be used in connection with the battery, thereby avoiding any balancing issues. A relative high voltage may be provided on the DC link, thereby reducing overall wasted energy and swamping any lower efficiency that may be caused by the circuit 324. An easy integration of different battery technologies may be provided by the architecture 700. In case of battery degradation during service life, the architecture 700 can minimize the consequences in term of performance downgrade increasing the overall reliability of the system.

Figure 8:
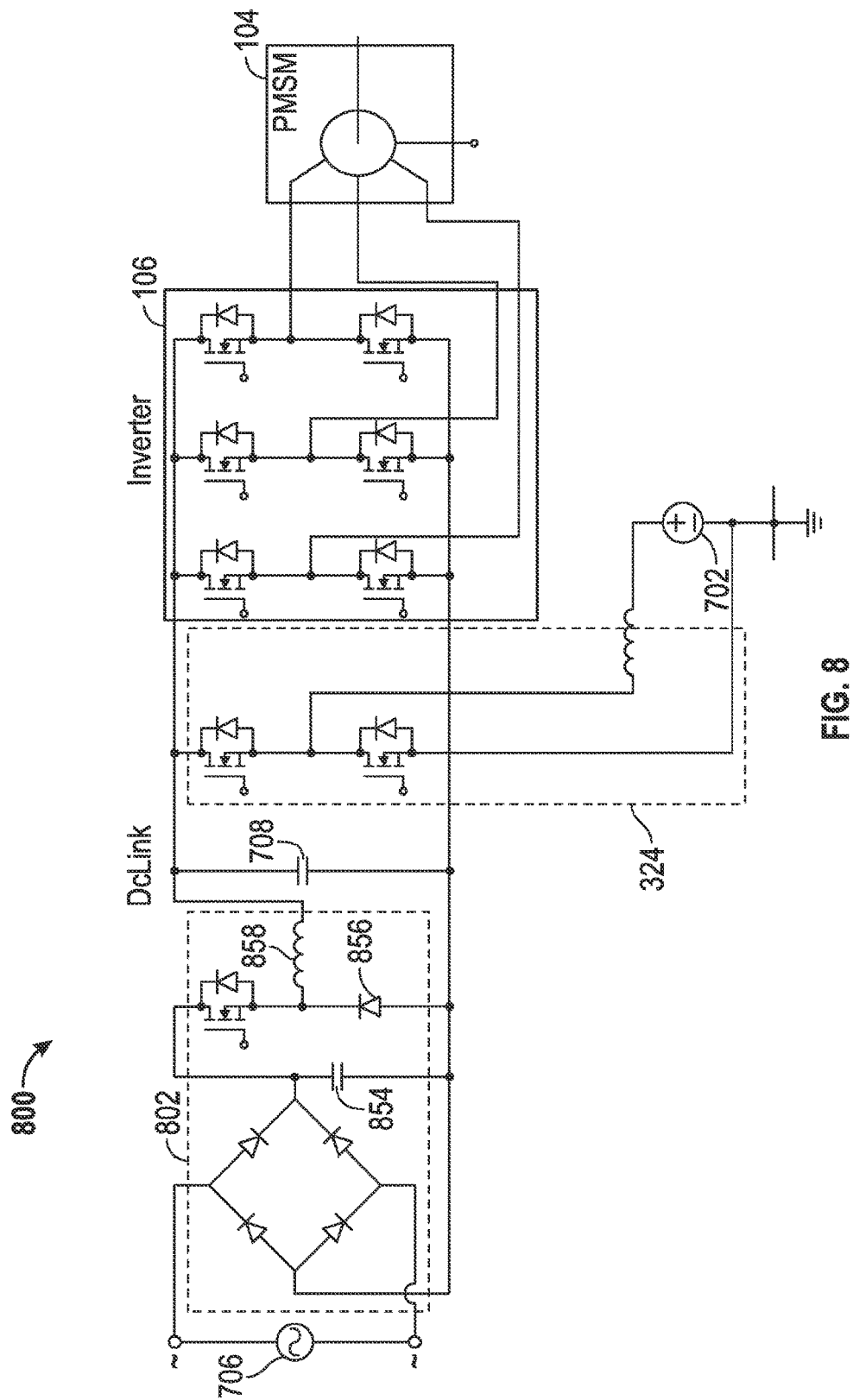
FIG. 8 illustrates an exemplary power architecture incorporating a battery and a rectifier circuit in accordance with one or more embodiments of the disclosure.

Turning now to FIG. 8, an exemplary power architecture 800 in accordance with one or more embodiments is shown. The architecture 800 is shown as including many of the components and devices described above, and so, a complete re-description is omitted for the sake of brevity.

As shown in FIG. 8, the architecture 800 may include a rectifier circuit 802. Relative to the architecture 700, the architecture 800 may be cheaper or less expensive to fabricate. For example, to save money the rectifier circuit 802 may be used in lieu of a charger (e.g., charger 704). The circuit 324, in combination with the rectifier circuit 802, may be used to charge the battery 702 in the architecture 800. As shown in FIG. 8, the rectifier circuit 802 may include one or more of a capacitor 854, a diode 856, and an inductor 858 with the scope to limit the power consumption from the external power/energy source 706 such as the electrical main line.

Figure 9:
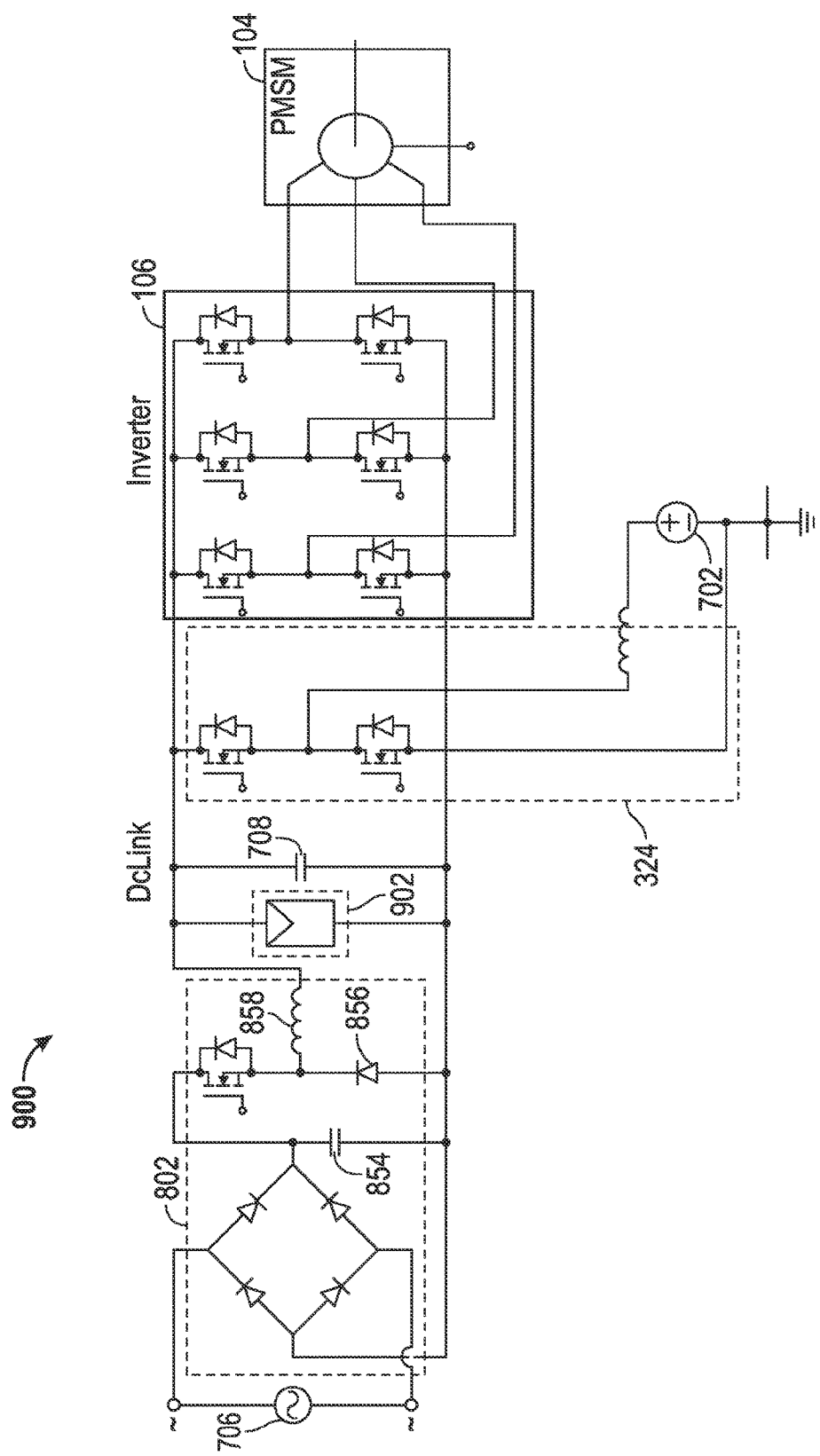
FIG. 9 illustrates an exemplary power architecture connected with an external photovoltaic panel in accordance with one or more embodiments of the disclosure.

Turning now to FIG. 9, an exemplary power architecture 900 in accordance with one or more embodiments is shown. The architecture 900 is shown as including many of the components and devices described above, and so, a complete re-description is omitted for the sake of brevity.

As shown in FIG. 9, the architecture 900 may be connected to a photovoltaic (PV) panel and/or wind generator 902. Connection of the PV panel/wind generator 902 may provide a number of features. For example, the PV panel/wind generator 902 may be efficiently connected sharing existing circuit 324 to work as charger regulator, thereby avoiding DC-AC-DC conversion and improving efficiency and minimizing material cost. The PV panel/wind generator 902 may couple to the circuit 324 and may function as a maximum power point tracking regulator. Propulsion battery power may be shared with the PV panel/wind generator 902.

Figure 10:
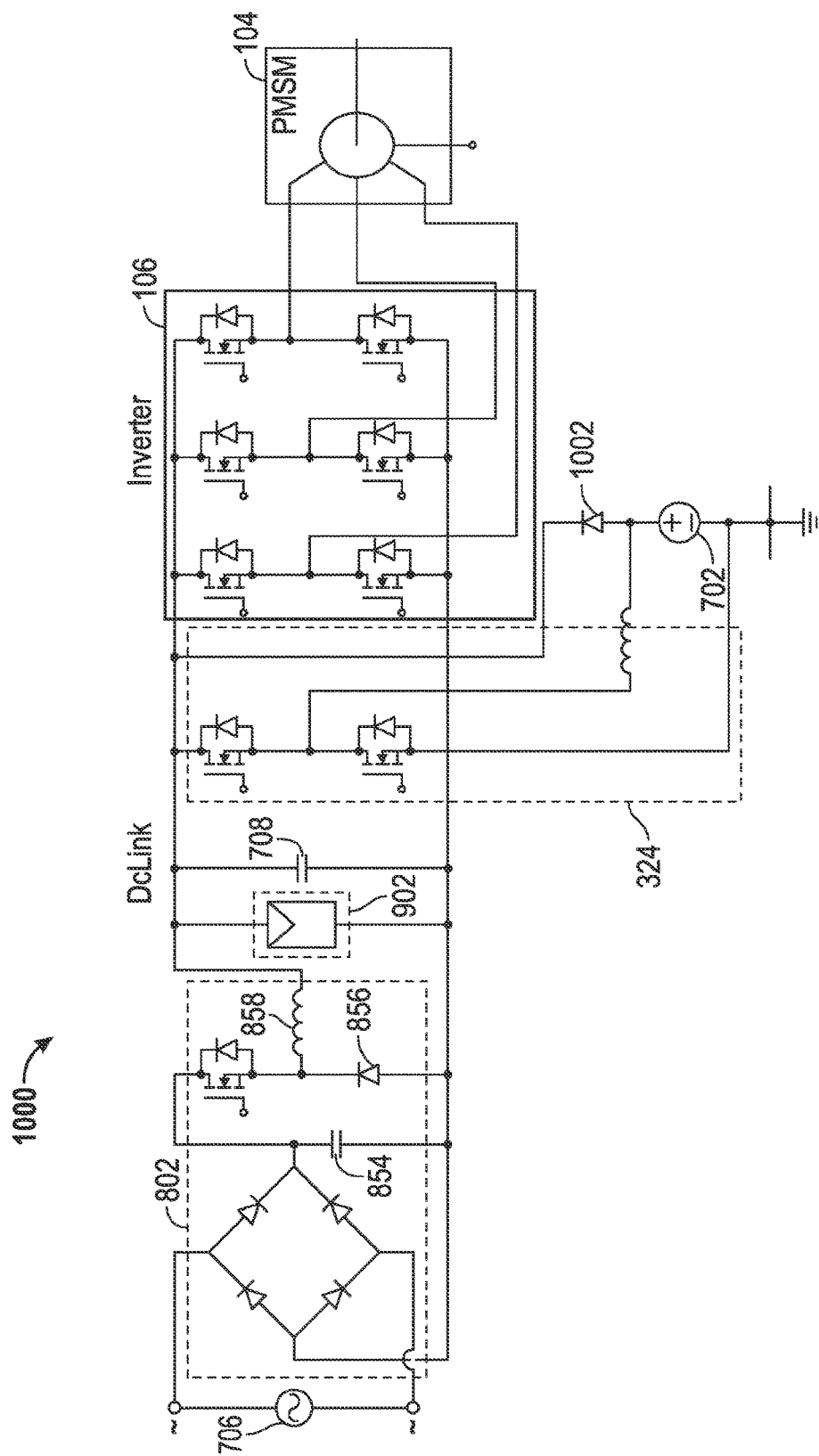
FIG. 10 illustrates an exemplary power architecture incorporating a power diode in accordance with one or more embodiments of the disclosure.

Turning now to FIG. 10, an exemplary power architecture 1000 in accordance with one or more embodiments is shown. The architecture 1000 is shown as including many of the components and devices described above, and so, a complete re-description is omitted for the sake of brevity.

As shown in FIG. 10, the architecture 1000 may include a power diode 1002. The power diode 1002 may be used as a last resource to provide needed energy when, e.g., the voltage across the capacitor 708 and the voltage provided by the battery 702 are approximately equal due to low state of charge of UC (e.g., within a threshold difference from one another). As a last resource, a specific operational mode can be triggered with the UC in low state of charge in terms of car/doors speed, to decrease the short term power and energy demand that may be caused by traffic peaks.

Figure 11:
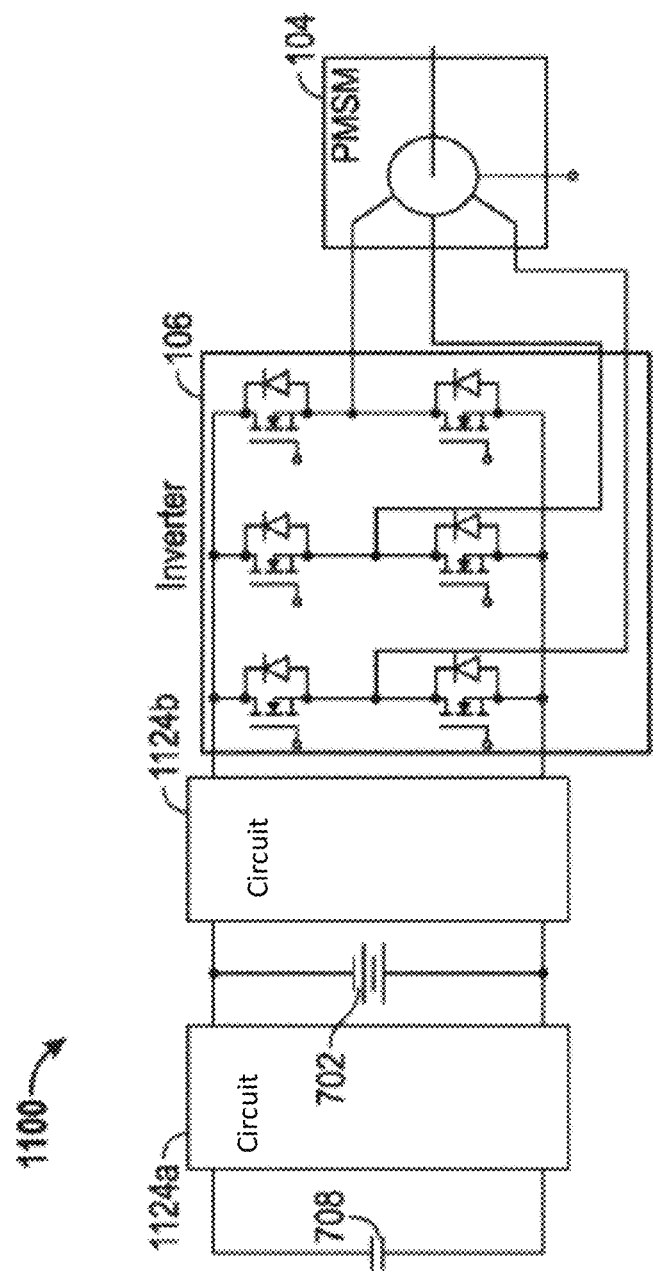
FIG. 11 illustrates an exemplary power architecture incorporating energy converters arranged in a cascade manner in accordance with one or more embodiments of the disclosure.

Turning now to FIG. 11, an exemplary power architecture 1100 in accordance with one or more embodiments is shown. The architecture 1100 is shown as including many of the components and devices described above, and so, a complete re-description is omitted for the sake of brevity.

The architecture 1100 may be characteristic of a "cascaded architecture." As shown in FIG. 11, the UC 708 may be coupled to a first circuit 1124a, which in turn may be coupled to the battery 702, which in turn may be coupled to a second circuit 1124b. The first circuit 1124a and/or the second circuit 1124b may correspond to the circuit 324 described previously (e.g., in some embodiments, the circuits 1124a and 1124b in FIG. 11 may correspond to or include energy exchangers or DC/DC converters).

In some embodiments, the positions of the capacitor 708 and the battery 702 may be changed relative to what is shown in FIG. 11. For example, in some embodiments, the battery 702 might only be coupled to the first circuit 1124a, and the capacitor 708 may be coupled to both the first circuit 1124a and the second circuit 1124b.

Turning now to FIG. 12, an exemplary power architecture 1200 in accordance with one or more embodiments is shown. The architecture 1200 is shown as including many of the components and devices described above, and so, a complete re-description is omitted for the sake of brevity.

The architecture 1200 may be characteristic of a "multiple input architecture." For example, the architecture 1200 may include a circuit 1224 that may include multiple inputs, wherein the multiple inputs may be coupled to the battery 702 and the UC 708. In some embodiments, the circuit 1224 may correspond to an energy exchanger or DC/DC converter and may be analogous to one or more of the circuit 324, 1124*a*, and 1124*b* described previously.

Embodiments may be used to realize next-generation platforms. For example, embodiments of the disclosure may provide for a speed of 2.5 m/s or more. Loads of 2500 kg or more may be supported. A rise of 180 m or more may be supported.

Embodiments may be tied to one or more particular machines. For example, one or more energy storage devices or systems may be provided to accept or deliver energy faster than what is available using conventional devices/systems. Regenerated energy may be recaptured by one or more devices.

In some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory having instructions stored thereon that, when executed by the one or more processors, cause the apparatus or system to perform one or more methodological acts as described herein. In some embodiments, one or more input/output (I/O) interfaces may be coupled to one or more processors and may be used to provide a user with an interface to an elevator system. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A system for an elevator, comprising:
   at least one battery; and
   an energy exchanger coupled to the at least one battery;
   an energy storage device coupled to the energy exchanger;
   wherein the energy storage device is configured to recapture energy that is not recaptured by the at least one battery during regenerative operation of the elevator, and
   wherein the energy storage device is configured to provide energy to the elevator when demand for energy by the elevator exceeds a threshold.

2. The system of claim 1, wherein the at least one battery comprises a first battery coupled to a second battery, and wherein the first and second batteries are center grounded.

3. The system of claim 1, wherein the energy storage device comprises at least one of: a lithium-ion battery, a nickel-metal hydride battery, and an ultra-capacitor.

4. The system of claim 1, wherein:
   the energy storage device comprises an ultra-capacitor,
   wherein the ultra-capacitor is configured to supply substantially all the power required by a drive-motor of the elevator,
   wherein the ultra-capacitor is configured to recapture substantially all the power generated by the elevator during regenerative operation of the elevator.

5. The system of claim 4, further comprising:
   a charger coupled to the at least one battery,
   wherein the charger is configured to charge the at least one battery.

6. The system of claim 4, further comprising:
   a rectifier circuit coupled to the ultra-capacitor,
   wherein the rectifier circuit, in combination with the energy exchanger, charges the at least one battery.

7. The system of claim 6, further comprising:
   at least one of a photovoltaic panel and a wind generator coupled to the energy exchanger.

8. The system of claim 7, further comprising:
   a power diode having an anode coupled to a positive terminal of the at least one battery and a cathode coupled to a DC link connected to the ultra-capacitor.

9. The system of claim 1, further comprising:
   a second energy exchanger coupled to the energy exchanger,
   wherein the energy exchanger and the second energy exchanger are arranged in a cascade architecture, and
   wherein at least one of the at least one battery and an ultra-capacitor resides in between the energy exchanger and the second energy exchanger in the cascade architecture.

10. The system of claim 1, wherein the energy exchanger comprises a plurality of inputs, and wherein a first of the plurality of inputs is coupled to the at least one battery, and wherein a second of the plurality of inputs is coupled to an ultra-capacitor.

* * * * *